US010614137B2

(12) United States Patent
Kalampoukas et al.

(10) Patent No.: US 10,614,137 B2
(45) Date of Patent: *Apr. 7, 2020

(54) SYSTEM AND METHOD FOR DETECTING REPEATING CONTENT, INCLUDING COMMERCIALS, IN A VIDEO DATA STREAM

(71) Applicant: Alphonso Inc., Mountain View, CA (US)

(72) Inventors: Lampros Kalampoukas, Brick, NJ (US); Manish Gupta, Bangalore (IN); Raghu Srinivas Kodige, San Carlos, CA (US)

(73) Assignee: Alphonso Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,749

(22) Filed: Oct. 22, 2018

(65) Prior Publication Data

US 2019/0163708 A1 May 30, 2019

Related U.S. Application Data

(63) Continuation of application No. 15/341,436, filed on Nov. 2, 2016, now Pat. No. 10,108,718.

(51) Int. Cl.
*G06F 16/951* (2019.01)
*G06F 16/71* (2019.01)
(Continued)

(52) U.S. Cl.
CPC ............ *G06F 16/951* (2019.01); *G06F 16/71* (2019.01); *G06F 16/78* (2019.01); *G06F 16/783* (2019.01);
(Continued)

(58) Field of Classification Search
CPC ...... G06F 16/951; G06F 16/783; G06F 16/71; G06F 16/7837; G06F 16/78;
(Continued)

(56) References Cited

U.S. PATENT DOCUMENTS 8,700,641 B2 4/2014 Covell et al.
8,996,810 B2 3/2015 Liang
(Continued)

FOREIGN PATENT DOCUMENTS

WO 2009/150425 A2 12/2009

OTHER PUBLICATIONS

Audible Magic® product brochures: Core Technology & Services Overview, Broadcast Monitoring, and Media Identification, Audible Magic Corporation, Los Gatos, California, downloaded from web pages at http://www.audiblemagic.com, download date: Aug. 11, 2016, 11 pages.

(Continued)

*Primary Examiner* — Nathan J Flynn
*Assistant Examiner* — Tung T Trinh
(74) *Attorney, Agent, or Firm* — Panitch Schwarze Belisario & Nadel LLP

(57) ABSTRACT

Methods and apparatus are provided for detecting potential repeating content, such as commercials, in a video data stream by receiving one or more video data streams, parsing each video data stream into a plurality of segments, creating a representation of each segment such as a segment fingerprint, storing the plurality of segment representations in a database, and identifying any segment representations in the received and parsed one or more video data streams that match segment representations in the database that were previously stored from video data streams that were previously received and parsed.

23 Claims, 8 Drawing Sheets

(51) Int. Cl.
*G06F 16/78* (2019.01)
*G06F 16/783* (2019.01)
*H04N 21/44* (2011.01)
*H04N 21/845* (2011.01)
*H04N 21/81* (2011.01)
*H04N 21/84* (2011.01)

(52) U.S. Cl.
CPC ... *G06F 16/7837* (2019.01); *H04N 21/44008* (2013.01); *H04N 21/812* (2013.01); *H04N 21/84* (2013.01); *H04N 21/8456* (2013.01)

(58) Field of Classification Search
CPC ........... H04N 21/44008; H04N 21/812; H04N 21/84; H04N 21/8456
See application file for complete search history.

(56) References Cited

U.S. PATENT DOCUMENTS

| | | | |
|---|---|---|---|
| 9,508,194 | B1 | 11/2016 | Worley, III |
| 10,108,718 | B2 * | 10/2018 | Kalampoukas ...... H04N 21/812 |
| 2003/0101144 | A1 * | 5/2003 | Moreno ................. G06F 16/40 705/62 |
| 2003/0121046 | A1 * | 6/2003 | Roy .................. G06K 9/00536 725/90 |
| 2004/0226035 | A1 | 11/2004 | Hauser |
| 2005/0193016 | A1 * | 9/2005 | Seet ...................... G06F 16/683 |
| 2006/0041902 | A1 * | 2/2006 | Zigmond .............. H04H 60/31 725/9 |
| 2006/0245724 | A1 * | 11/2006 | Hwang .................... H04N 5/76 386/241 |
| 2007/0124756 | A1 | 5/2007 | Covell et al. |
| 2008/0267584 | A1 | 10/2008 | Green |
| 2009/0254933 | A1 * | 10/2009 | Gupta .................... H04H 20/14 725/14 |
| 2010/0153993 | A1 | 6/2010 | Konig et al. |
| 2010/0246955 | A1 | 9/2010 | Wright et al. |
| 2010/0306808 | A1 * | 12/2010 | Neumeier .......... H04N 5/44591 725/105 |
| 2011/0145001 | A1 * | 6/2011 | Kim ....................... G10L 25/48 704/278 |
| 2011/0208722 | A1 * | 8/2011 | Hannuksela ......... G11B 27/034 707/723 |
| 2011/0289114 | A1 | 11/2011 | Yu et al. |
| 2012/0114167 | A1 | 5/2012 | Tian et al. |
| 2013/0071090 | A1 | 3/2013 | Berkowitz et al. |
| 2013/0160038 | A1 * | 6/2013 | Slaney ................ G06F 16/7834 725/14 |
| 2013/0205318 | A1 | 8/2013 | Sinha et al. |
| 2014/0013352 | A1 * | 1/2014 | Shavit ................ H04N 21/8358 725/34 |
| 2014/0133695 | A1 | 5/2014 | Lienhart et al. |
| 2014/0282673 | A1 * | 9/2014 | Neumeier ........ H04N 21/44008 725/19 |
| 2015/0082349 | A1 * | 3/2015 | Ishtiaq ............. H04N 21/23418 725/40 |
| 2016/0037232 | A1 | 2/2016 | Hu et al. |
| 2016/0150274 | A1 | 5/2016 | Bilobrov et al. |
| 2016/0156972 | A1 | 6/2016 | Oztaskent et al. |
| 2016/0205289 | A1 | 7/2016 | Li et al. |
| 2017/0094349 | A1 | 3/2017 | Maughan |

OTHER PUBLICATIONS

Brandon Satterwhite and Oge Marques, "Automatic Detection of TV Commercials." (Satterwhite, B.; Marques, O.; Potentials, IEEE, vol. 23, Issue 2, Apr.-May 2004, pp. 9-12 (4 pages).
Gracenote Entourage™, Gracenote, Inc., Emeryville, California, downloaded from webpage: http://www.gracenote.com/video/media-recognition-and-insights/, download date: Aug. 24, 2016, 5 pages.
Int'l Search Report and Written Opinion dated Jan. 17, 2018 in Int'l Application No. PCT/US2017/058285.
Int'l Search Report and Written Opinion dated Dec. 11, 2017 in Int'l Application PCT/US17/57952.
Office Action dated Jun. 27, 2017 in U.S. Appl. No. 15/341,436, by Trinh.
Wikipedia entry for "Automatic Content Recognition." downloaded from web page: https://en.wikipedia.org/w/index.php?title=Automatic_content_recognition&printable=yes, download date: Aug. 11, 2016, 4 pages.
Int'l Preliminary Report on Patentability dated May 16, 2019 in Int'l Application No. PCT/US2017/057952.
International Preliminary Report on Patentability dated Dec. 17, 2018 in International Application No. PCT/US2017/058285.
International Preliminary Report on Patentability dated Feb. 7, 2019 in International Application No. PCT/US2017/058285.

* cited by examiner

SYSTEM AND METHOD FOR DETECTING REPEATING CONTENT, INCLUDING COMMERCIALS, IN A VIDEO DATA STREAM

CROSS-REFERENCE TO RELATED APPLICATIONS

This application is a continuation of copending U.S. application Ser. No. 15/341,436 filed Nov. 2, 2016, which is incorporated by reference in its entirety herein.

BACKGROUND OF THE INVENTION

TV advertising commercials exist in virtually all video data streams, subsidizing some or all of the cost of providing the content to the viewer. The ability to identify where the commercials exist in the video data stream has become an important goal for two main reasons. First, advertisers who pay to place the commercials wish to verify that the commercials were actually played, either by being "aired" during a broadcast, or "streamed" during an internet-based viewing session. The auditing process can be greatly enhanced if commercials can be identified as they are being played so that there can be a recordation to document the airing or streaming. Second, technology built into a video playing device, or executing concurrently with a video playing device, can "skip" commercials, assuming that the location of the commercials can be accurately identified so that no programming is skipped. Some conventional technology for identifying where commercials exist in a video data stream is described in an article entitled "Automatic Detection of TV Commercials" (Satterwhite, B.; Marques, O.; Potentials, IEEE, Volume 23, Issue 2, April-May 2004 pp. 9-12). Satterwhite et al. describes two main categories of methods for detecting commercials, namely, "feature-based detection" and "recognition-based detection." Feature-based detection uses general characteristics of commercials embedded within a media stream to detect their possible presence. Recognition-based detection works by trying to match commercials with ones that were already learned. Some general characteristics (heuristics) of commercials and commercial breaks include the following:

i. Multiple frames of black are displayed at the beginning and end of each commercial block and between each commercial in the block. There is no audio during these frames.

ii. If a network displays a logo in the corner of the screen, the logo will not appear during the commercials.

iii. Duration is typically some increment of 15 seconds, up to 90 seconds.

iv. Commercials are high in "action," measured by a relatively larger number of cuts per minute between frames compared to a TV show.

v. Commercial breaks tend to occur at the same time in each episode of a given TV series.

The conventional technology for identifying where commercials exist in a video data stream have numerous disadvantages which limit their effectiveness. Accordingly, there is a need for new approaches for identifying where commercials exist in a video data stream. The present invention fulfills such a need.

There are also instances where it is desirable to identify "repeating content" in video data streams. The present invention also fulfills this need.

SUMMARY OF THE PRESENT INVENTION

Methods and apparatus are provided for detecting potential repeating content, such as commercials, in a video data stream by receiving one or more video data streams, parsing each video data stream into a plurality of segments, creating a representation of each segment such as a segment fingerprint, storing the plurality of segment representations in a database, and identifying any segment representations in the received and parsed one or more video data streams that match segment representations in the database that were previously stored from video data streams that were previously received and parsed.

BRIEF DESCRIPTION OF THE DRAWINGS

Preferred embodiments of the present invention will now be described by way of example with reference to the accompanying drawings.

DETAILED DESCRIPTION OF THE INVENTION

Figure 1:
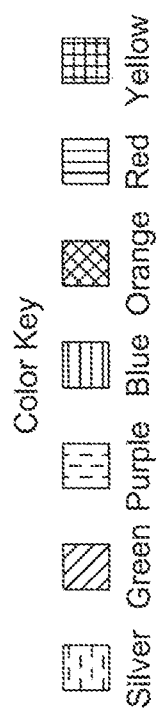
FIGS. 1-4 show an overview of one preferred embodiment of the present invention for detecting commercials in a video data stream.
Figure 1:
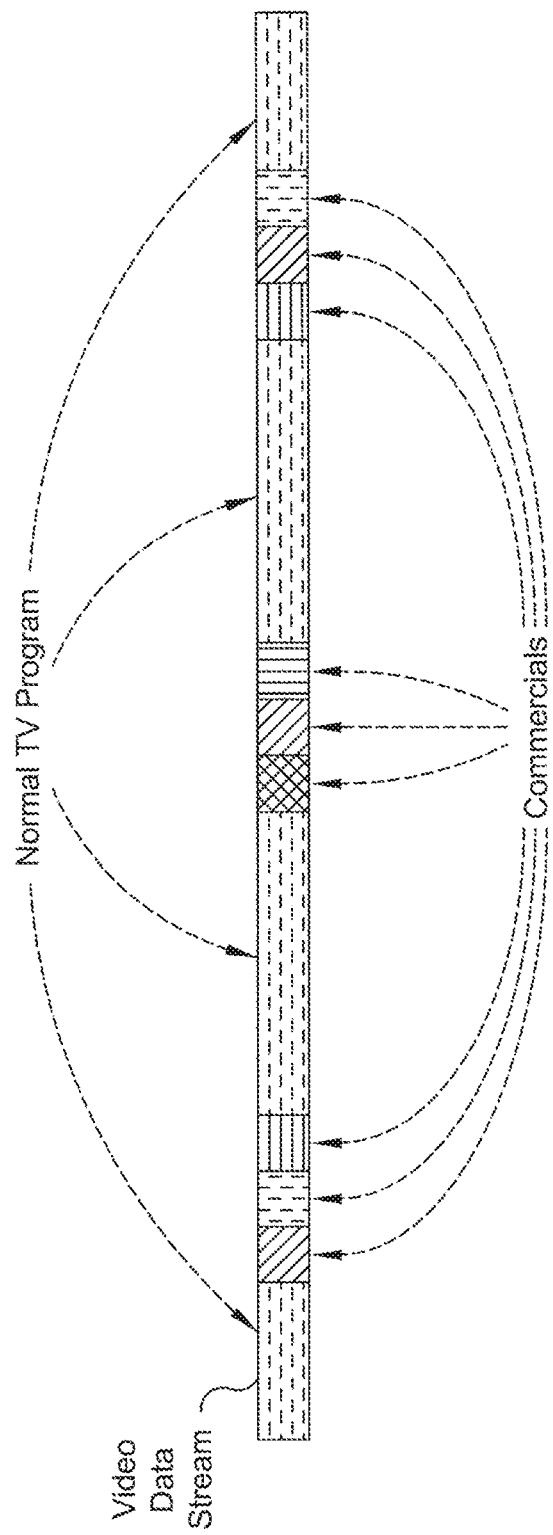

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio.

segment (also, referred to interchangeably as a "content segment")—A segment is a portion of a video data stream that spans a time length. The segment includes the contents of the video data stream within that time length.

segment representation—a representation of a segment that can be easily used by a search engine for virtually instantaneous comparison with a stored database of segment representations. In one preferred embodiment, the segment representation is a digital signature of the segment, such as a segment fingerprint. However, other types of segment representations are within the scope of the present invention.

neighboring segment representation—a segment representation that is next to or very near another segment representation with respect to the timestamps of the corresponding segments. "Neighboring" as used herein does not necessarily require immediate adjacency. That is, there may be a small time gap between the corresponding segments filled by other segments.

commercial (also, referred to interchangeably as an "advertisement" or "ad")—A "commercial" is an advertisement for a product or service, and also includes advertising for a program type content, known in the TV industry as a "promo." A commercial is thus distinguishable from "program type content." An example of "program type content" is a TV show.

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour. One common format for a commercial break is to show national advertisements first, followed by regional/local advertisements, and concluding with promos.

clip—The video data stream may be clipped between a start time and a stop time so as to capture a segment of interest, typically a potential commercial that has not yet been identified.

repeating content—Repeating content is any content that appears more than once over a time period of interest. Examples of repeating content include commercials and program type content (e.g., a TV show) that is rebroadcast. The time period of interest may be finite or infinite.

II. Detailed Disclosure

FIGS. 1-4 show an overview of one preferred embodiment of the present invention for detecting commercials in a video data stream. In this example, the video data stream is a live TV stream (e.g., TV channel) wherein commercial breaks are interspersed during a normal TV program. Here, each commercial break includes three commercials.

Figure 2:
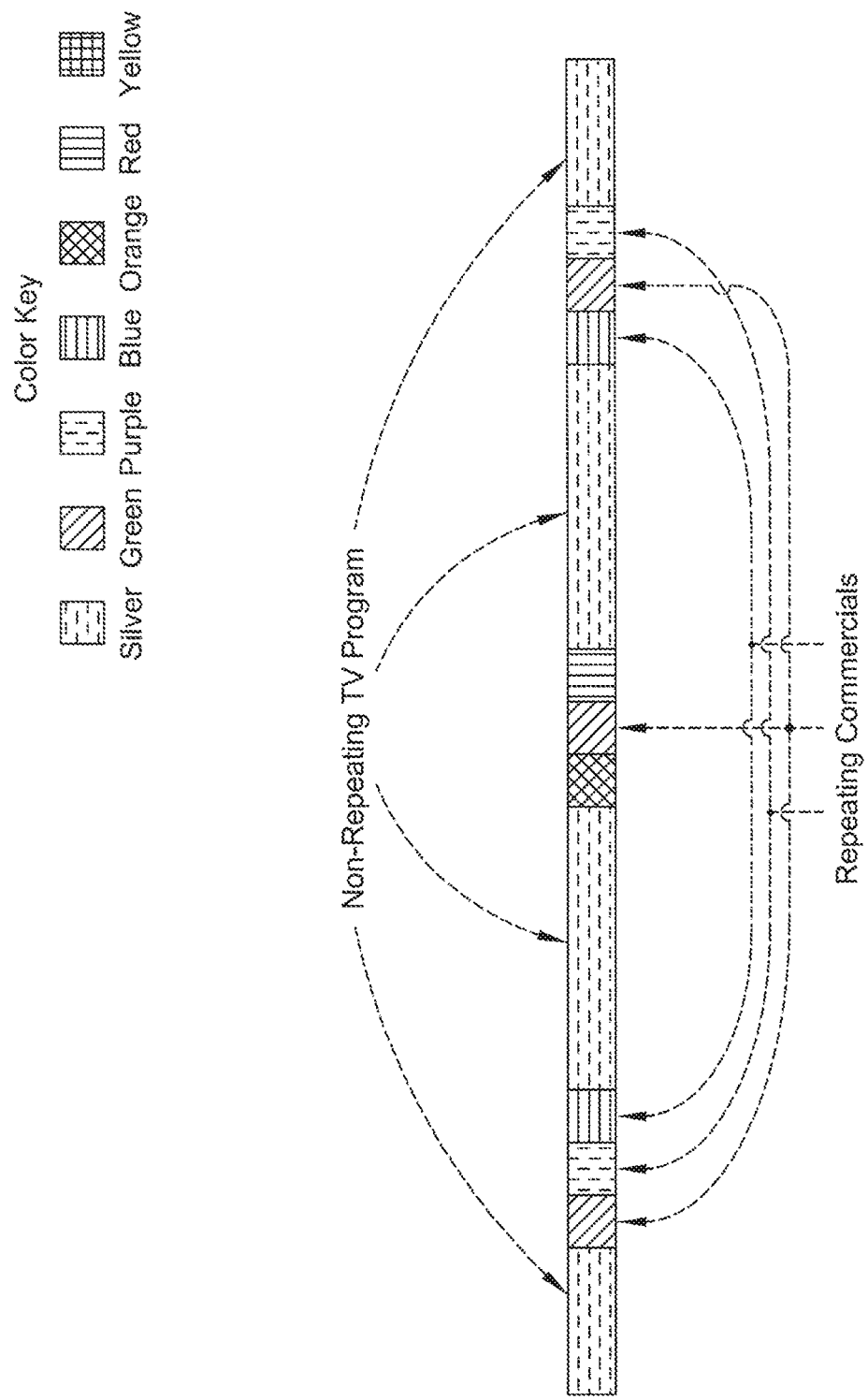

One of the differences between commercials and program type content (e.g., a TV show) is that the contents of commercials often repeat as shown in FIGS. 1 and 2. In fact, commercials are almost always repeated shortly after an initial airing since they are typically shown as part of a coordinated ad campaign. A commercial may be repeated on the same TV channel and/or on a different TV channel, especially in the case of national advertisements. The colored square blocks in FIGS. 1 and 2 are commercials which are repeatedly aired. FIG. 2 also identifies non-repeating TV program type content. In this simplified example, the TV show does not repeat. However, over a longer time frame (e.g., one week or one month), some TV shows will repeat by being rebroadcast. However, in a shorter time frame (e.g., one day or one week), the TV show may not repeat. Thus, in a shorter time frame, a general observation can be made that commercials are repeatedly broadcasted or aired whereas TV shows are not repeated as often. This fact, along with the fact that commercials are shorter than TV shows, can be exploited to detect and clip commercials out of video data streams.

Figure 3:
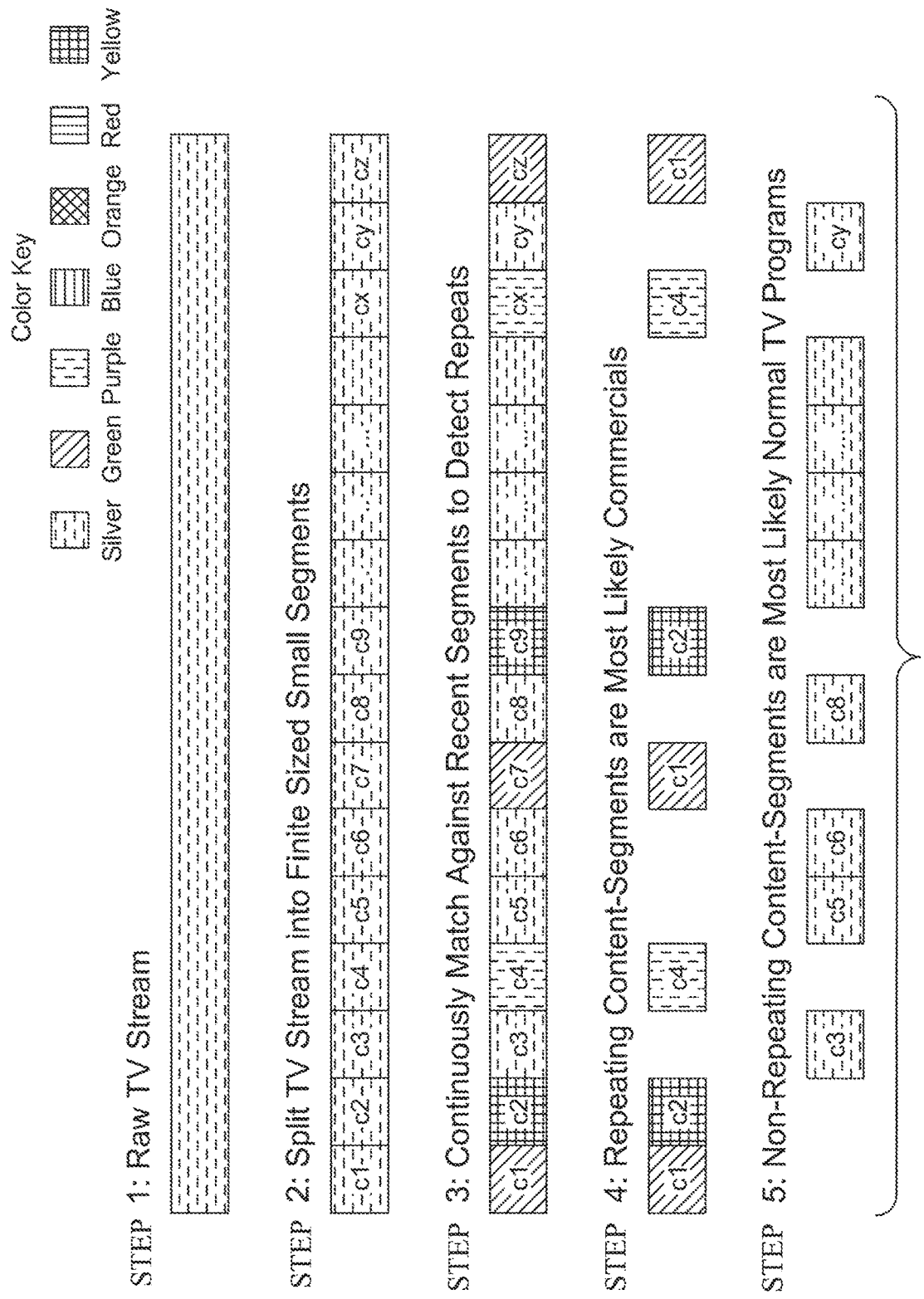

FIG. 3 shows an overview of the process implemented by the following steps which correlate to the five numbered content streams of FIG. 3:

1. Receive a video data stream (raw TV stream).
2. Split the video data stream into small finite sized content segments (c1, c2, c3, . . . cx, cy, cz are the content segments).
3. Continuously match each and every new content segment against a group of previously stored content segments from video data streams that were previously aired or streamed in the recent past. For example:

c7 and cz matched c1.

c9 matched c2 cx matched c4

4. Any content which is observed to be repeatedly appearing in a video data stream can be declared most likely to be a commercial. For example, c1, c2 and c4 are most likely commercials.
5. Any content which is found to be not repeating (in the recent past) can be declared to be program type content (e.g., a TV show). For example, c3, c5, c6, c8, . . . cy are most likely program type content.

Figure 4:
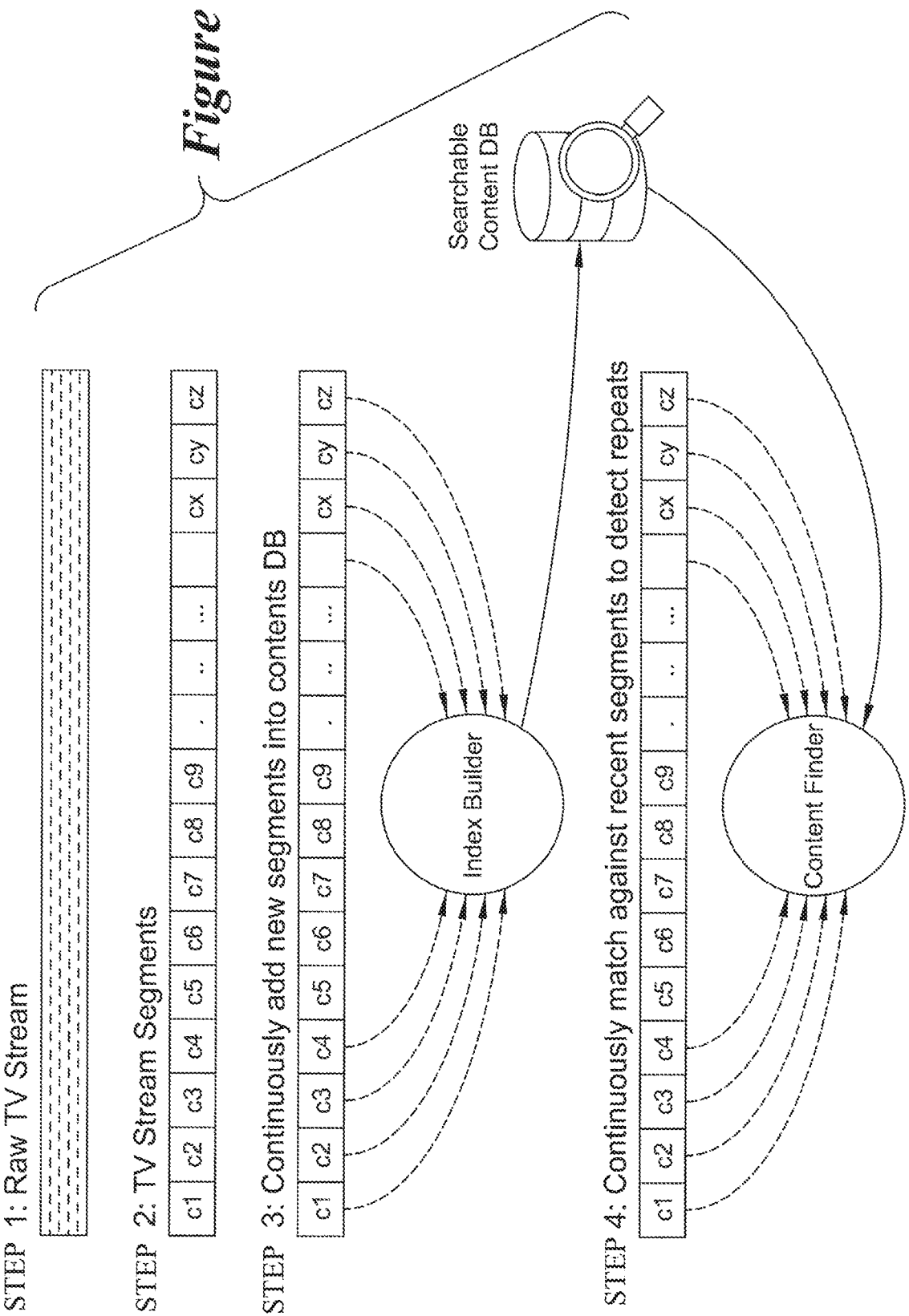

FIG. 4 shows an overview of system components for implementing the process described above, wherein the following steps correlate to the four numbered content streams of FIG. 3:

1. A system (shown in more detail in FIG. 5) receives a video data stream (raw TV stream).
2. The system splits the video data stream into small finite sized content segments (c1, c2, c3, . . . cx, cy, cz are the content segments).
3. The system continuously pushes the content segments into a searchable contents database which indexes the content segments.
4. The system continuously (in parallel) searches for a match for each and every content segment in the contents database which, in one preferred embodiment, contains only recently aired or streamed contents.

FIGS. 1-4 show only one video data stream. However, a plurality of video data streams (e.g., hundreds of TV channels) are preferably processed concurrently in the same manner. Since commercials may air on multiple TV channels, a commercial first aired on a first channel may be aired again on a different channel shortly thereafter. Thus, the system is designed to simultaneously ingest and process multiple video data streams.

Figure 5:
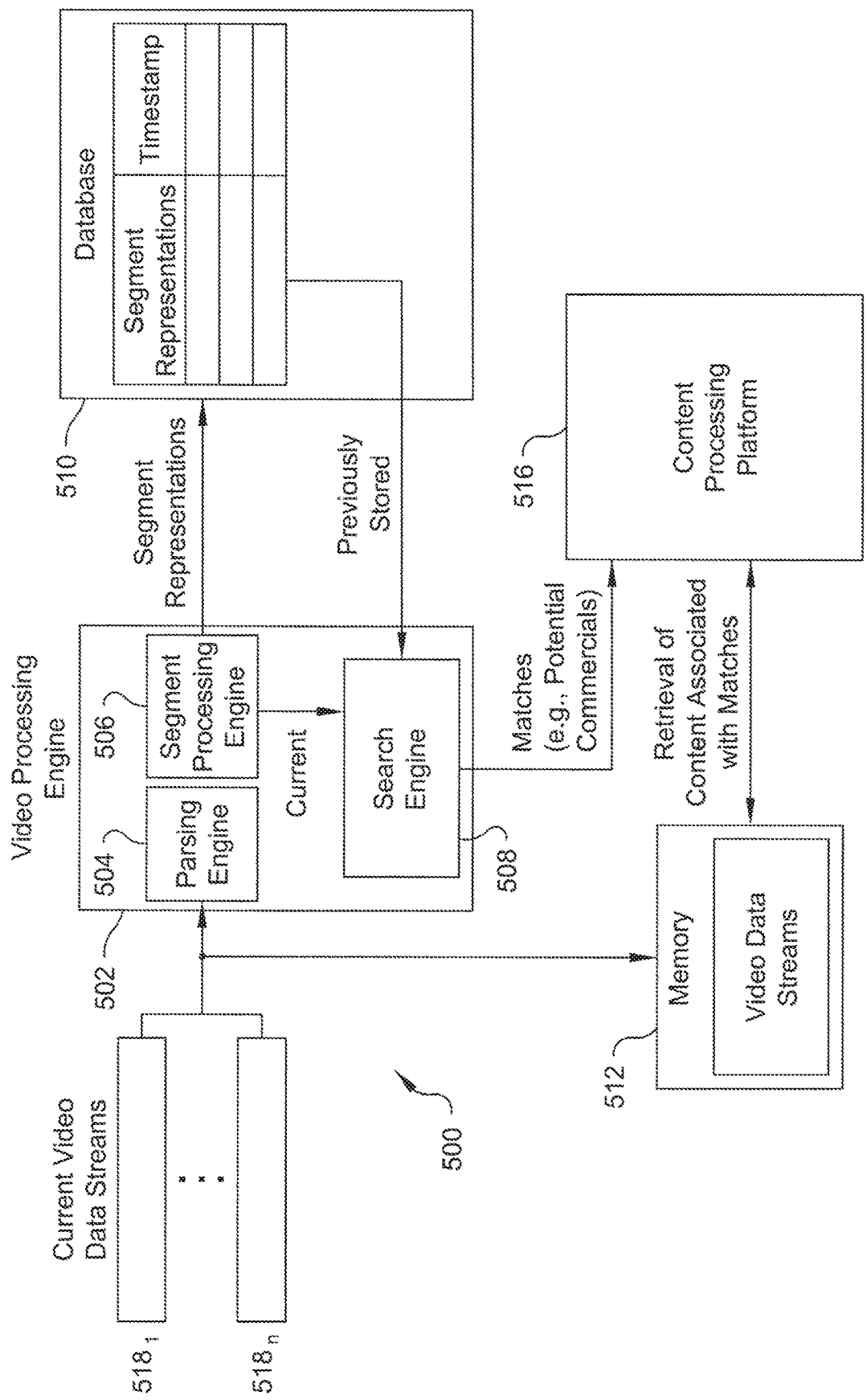
FIG. 5 is a schematic diagram of a system for implementing one preferred embodiment of the present invention.

FIG. 5 shows a schematic diagram of a system 500 for implementing one preferred embodiment of the present invention. System components include a video processing engine 502 including a parsing engine 504, a segment processing engine 506 and a search engine 508; a database 510; a memory 512; and a content processing platform 516. Current video data streams $518_1$ to $518_n$ feed into the video processing engine 502 and the memory 512. The video processing engine 502 performs at least the following functions:

1. Parses the current video data streams into a plurality of segments.
2. Creates a representation of each segment. In one preferred embodiment, the representation is a digital signature of the segment, such as a segment fingerprint. However, other types of representations are within the scope of the present invention.
3. Communicates the segment representations to the database 510.
4. Identifies, using the search engine 508, any segment representations in the received and parsed video data streams that match segment representations in the database 510 that were previously stored from video data streams that were previously received and parsed.

5. Communicates the matched segment representations to the content processing platform 516.

The database 510 stores the segment representations and their respective timestamps indicating when the related segment was aired or streamed. In one preferred embodiment, newly received segment representations are stored in the database 510 for about 7 to about 14 days. This time frame is sufficient to detect re-airings of almost all commercials shown across TV stations in the United States, assuming that video data streams are being received from almost all of the TV stations. A shorter time frame, such as 6 hours, is also feasible to detect most commercials under these same conditions. The shorter time frame has the advantage of reducing the amount of storage required by the database 510, as well as the processing overhead required by the search engine 508.

The database 510 also stores a "hit" count for each segment representation. A segment representation that has a hit count greater than "1" is considered a candidate for repeating content. As used herein, a "hit" is an instance where a sample (e.g., segment representation) from the video data stream matches a portion of a previously stored sample in the database 510. As used herein, "hit count" is the number of times that the previously stored sample matches a newly received sample from the video data stream.

The content processing platform 516 performs recognition processing. The platform 516 uses the timestamps of the matching segment representations to retrieve selected content portions of the original video data streams from the memory 512 to use in the recognition processing. To ensure that the entire commercial is retrieved from the memory 512, the content of adjacent segments sufficient to cover the time length of the longest likely commercial is preferably retrieved. In one example, this would be 1 minute before and after the segment's timestamp. However, other retrieval processes are within the scope of the present invention.

Once a commercial has been properly clipped by the platform 516, appropriate identification and metadata is associated with the clip. Once a commercial is recognized, it may be logged into a library of known commercials. Also, the airing of the commercial may be tracked for auditing purposes, as is well-known in the art. Information regarding the original source of the commercial is stored in the memory 512.

The index builder and content finder in FIG. 4 are components of the search engine 508. The searchable content database in FIG. 4 is the database 510 of FIG. 5.

Figure 6:
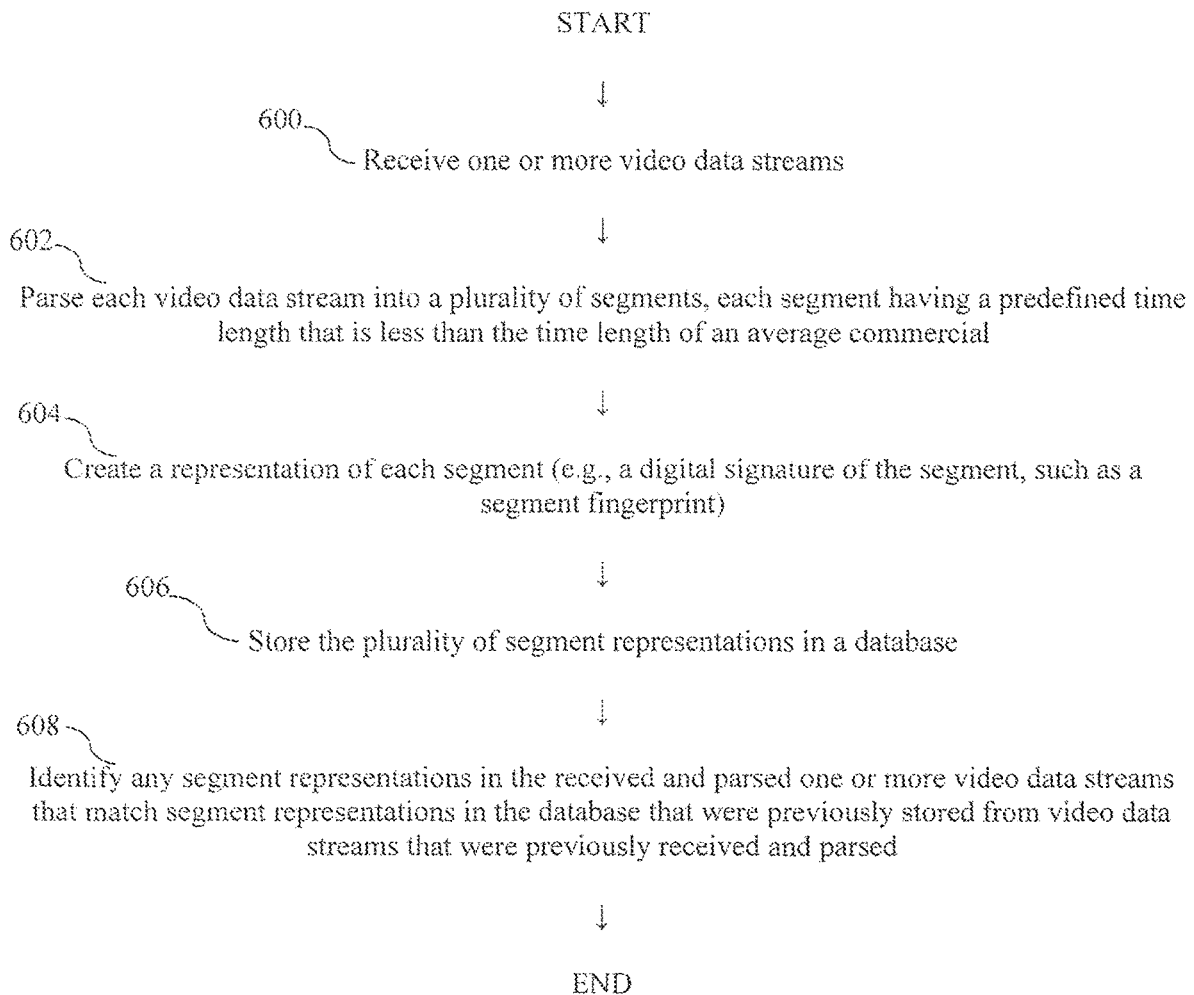
FIGS. 6 and 7 are flowcharts for implementing preferred embodiments of the present invention.

FIG. 6 is a flowchart of one preferred embodiment of the present invention for automatically detecting potential commercials in a video data stream that contains segments of program type content and commercial content, wherein program type content has a time length that is significantly longer than the time length of a commercial, and wherein segment representations of the video data stream are maintained in a database.

STEP 600: Receive one or more video data streams in a video processing engine.

STEP 602: Parse, by the video processing engine, each video data stream into a plurality of segments. Each segment has a predefined time length that is less than the time length of an average commercial.

STEP 604: Create a representation of each segment.

STEP 606: Store the plurality of segment representations in a database. The database includes database records. Each record includes one segment representation and an associated timestamp that represents the time that the segment was aired or streamed.

STEP 608: Identify, by a search engine, any segment representations in the received and parsed one or more video data streams that match segment representations in the database that were previously stored from video data streams that were previously received and parsed. The video processing engine designates the content of each of the identified segment representations as being a portion of one or more potential commercials.

Figure 7:
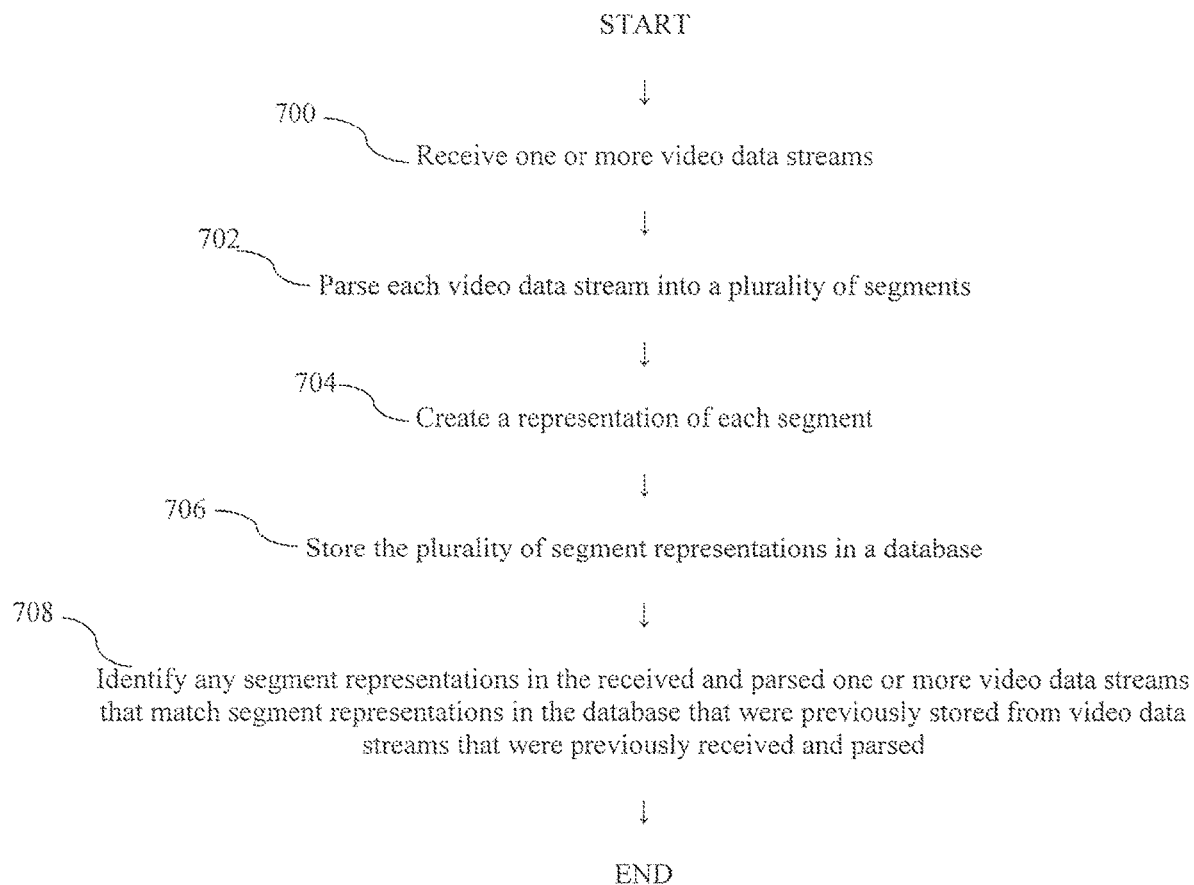

FIG. 7 is a flowchart of one preferred embodiment of the present invention for detecting potential repeating content in a video data stream, wherein segment representations of the video data stream are maintained in a database.

STEP 700: Receive one or more video data streams in a video processing engine.

STEP 702: Parse, by the video processing engine, each video data stream into a plurality of segments.

STEP 704: Create a representation of each segment.

STEP 706: Store the plurality of segment representations in a database. The database includes database records. Each record includes one segment representation and an associated timestamp that represents the time that the segment was aired or streamed.

STEP 708: Identify, by a search engine, any segment representations in the received and parsed one or more video data streams that match segment representations in the database that were previously stored from video data streams that were previously received and parsed. The video processing engine designates the content of each of the identified segment representations as being a portion of repeating content.

III. Additional Considerations

A. Content Segments

In one preferred embodiment, the content segments have a time length of about 2 seconds to about 10 seconds, and more preferably, about 4 seconds. However, the time lengths of the content segments may be longer or shorter depending upon the particular implementation and use case.

B. Search Engine 508

Search engines that perform the type of recognition described above are well-known in the art and are incorporated into automated content recognition (ACR) systems. One type of ACR system having such a search engine uses audio fingerprints within video signals to perform the content recognition. One commercially available audio ACR system is made by Audible Magic Corporation, Los Gatos, Calif. Another commercially available audio ACR system is Gracenote Entourage™ commercially available from Gracenote, Inc., Emeryville, Calif. Other ACR systems are disclosed in U.S. Patent Nos. 2011/0289114 (Yu et al.), 2013/0071090 (Berkowitz et al.), and 2013/0205318 (Sinha et al.), each of which are incorporated by reference herein. Accordingly, the details of the search engine 508 and the database 510 with respect to the recognition processing are not further described.

As is well-known in the art, search engines associated with ACR systems perform the comparisons on representations of content, such as fingerprints of the content. Thus, in one embodiment, the database 510 maintains segment representations in the form of segment fingerprints for comparison with fingerprints of parsed content in the incoming video data stream. As is also well-known in the art, a "fingerprint" is typically composed of a string of individual fingerprints, each capturing a very small time length of the content's audio and/or video.

One preferred embodiment of the present invention described above uses an audio ACR system to perform the functions of the search engine 508. However, it is well-known in the art that ACR systems may use video, as well as combinations of audio and video to perform the content (segment) comparison and recognition, and the scope of the present invention includes such combinations.

In alternative embodiments of the present invention, the search engine 508 may use other types of matching processes than ACR. For example, certain types of tags (e.g., fingerprints) may be embedded in the video data that can be exploited for segment matching. In one embodiment, a broadcaster or advertiser may insert one or more tags in the audio-visual signal for a specific program or commercial. The same program or commercial aired or streamed at a later date would have the same one or more tags. If the video processing engine 502 is programmed to detect such tags, they can be stored in the database 510 and exploited by the search engine 508 in the same manner as described above with respect to the segment representations.

C. Neighboring Segment Representations

As discussed above in the Definitions section, a neighboring segment representation is a segment representation that is next to or very near (not necessarily adjacent to) another segment representation with respect to the timestamps of the corresponding segments. Neighboring segment representations are useful for identifying repeating program content, such as repeating episodes of shows or rebroadcasts of programs, via the following steps:

1. Identify, by the search engine, any plurality of neighboring segment representations that
   (i) match previously stored segment representations in the database, and
   (ii) have a total segment length significantly longer than the time length of an average commercial, wherein the total segment length is the total time length from the first to the last neighboring segment representations as determined from the respective timestamps.
2. Delete as a segment representation of a potential commercial the plurality of identified neighboring segment representations.

D. Audio Data Streaming

In one alternative embodiment, the system described above may be used to detect potential commercials in an audio data stream, which may include (i) a conventional broadcast audio signal, such as AM/FM or satellite radio, or (ii) streaming services that deliver audio content to a user's device that is connected to a network. The same system described above may be used to implement this embodiment wherein the audio data stream is processed in the same manner as the audio portion of the video data stream and the segments are audio segments, and wherein the search engine 508 uses audio-based ACR.

E. Short Program Content

In some types of programming, such as portions of a sports game, the video data stream will not mimic the paradigm of FIGS. 1 and 2 wherein the program type content has a time length that is significantly longer than the time length of a commercial. Instead, the program type content may have a time length that is similar in length, or even shorter, than the time length of a commercial. The scope of the present invention includes the ability to process this type of video data stream in the same manner as described above.

F. Library of Known Commercials

In one alternative embodiment, segments of the current video data stream may be compared to segments in a library of known commercials to eliminate the need to process such segments using the system in FIG. 5 if a match is detected based on this comparison. Stated another way, if the current video data stream includes a known commercial, there is no need to process segments of the commercial to determine if it constitutes repeating content, and thus qualifies as a potential commercial.

Figure 8:
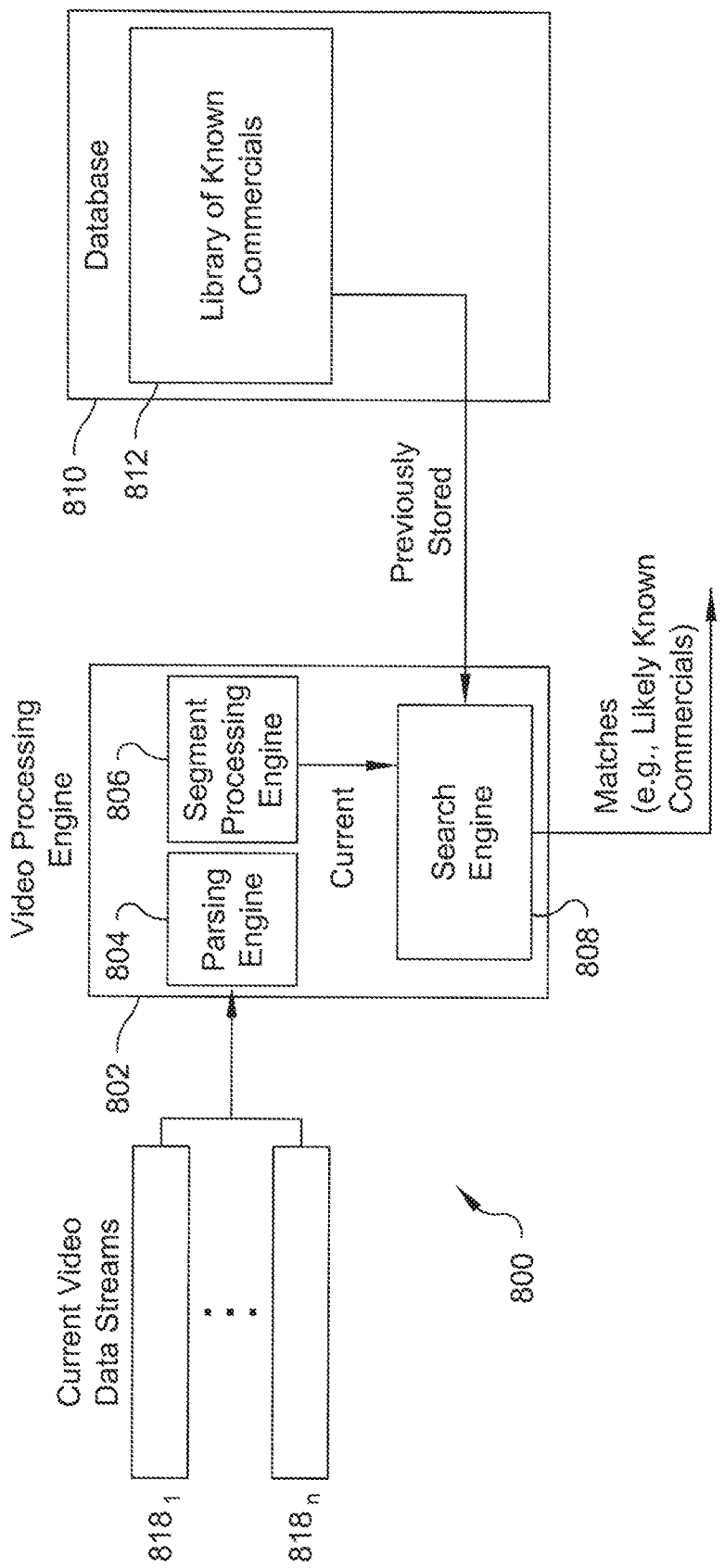
FIG. 8 is a schematic diagram of a system for implementing another preferred embodiment of the present invention.

FIG. 8 shows a system 800 for detecting such known commercials. Current video data streams $818_1 \ldots 818_n$ are inputted to video processing engine 802 which includes a parsing engine 804, a segment processing engine 806 and a search engine 808. The search engine 808 compares segment representations outputted by the segment processing engine 806 with segment representations received from database 810 which includes a library of known commercials 812. Matches represent likely known commercials.

Once detected, the segments associated with the likely known commercial are not processed using the system components of FIG. 5 that detect potential repeating content. The system 800 of FIG. 8 may run in parallel with the system 500 of FIG. 5 and may share similar components and processing elements. For example, the system 800 may use the video processing engine 502 and the database 810 to first detect if the current video data stream includes a likely known commercial. If so, the video processing engine 502 does not perform any further processing to determine if repeating content exist by attempting to match previously stored segment representations with current segment representations. If not, the video processing engine 502 functions as described above to determine if repeating content exist by attempting to match previously stored segment representations with current segment representations.

The present invention may be implemented with any combination of hardware and software. If implemented as a computer-implemented apparatus, the present invention is implemented using means for performing all of the steps and functions described above.

When implemented in software, the software code for the video processing engine 502, 802 and its search engine 508, 808 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the video processing engine 502, 802 and its search engine 508, 808 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The video processing engine 502, 802; database 510, 801; memory 512 and content processing platform 516 may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of detecting potential commercials in a video data stream that contains (i) segments of program type content, and (ii) commercial content, wherein segment representations of the video data stream are maintained in a first database, the method comprising:
   (a) receiving one or more video data streams in a video processing engine;
   (b) parsing, by the video processing engine, each video data stream directly into a plurality of successively contiguous segments, each segment having a predefined time length that is less than the time length of an average commercial;
   (c) creating, by the video processing engine, a representation of each segment, the representation of each segment being one or more fingerprints;
   (d) comparing, by a search engine that is in communication with the video processing engine, the plurality of segment representations to a plurality of known segment representations in a second database, and detecting any matches, the matches being likely known commercials,
      the method further comprising for segment representations that are not detected as matching known segment representations in the second database;
   (e) storing the plurality of segment representations in the first database, the first database including database records, each record including one segment representation and an associated timestamp that represents the time that the segment was aired or streamed;
   (f) identifying, by the search engine that is in communication with the video processing engine and the first database, any segment representations in the received and parsed one or more video data streams that match segment representations in the first database that were previously stored from video data streams that were previously received and parsed, wherein the video processing engine designates the content of each of the identified segment representations as being a portion of one or more potential commercials; and
   (g) electronically communicating the content of each of the segment representations identified in step (f) and the content of a predefined number of segment representations adjacent in time to the segment representations identified in step (f) to a content processing platform for subsequent recognition processing.

2. The method of claim 1 wherein the segment representations are temporarily stored in the first database for a predefined period of time.

3. The method of claim 2 wherein the segment representations are stored for about 7 to about 14 days.

4. The method of claim 1 wherein the subsequent recognition processing includes review and classification of the content.

5. The method of claim 1 further comprising:
   (h) identifying, by the search engine any segment representations in the received and parsed one or more video data streams that do not match segment representations in the first database that were previously stored from video data streams that were previously received and parsed, wherein the video processing engine designates the content of each of the identified segment representations as being a portion of program type content.

6. The method of claim 1 wherein the predefined time length is about 2 seconds to about 10 seconds.

7. The method of claim 1 wherein the predefined time length is about four seconds.

8. The method of claim 1 further comprising:
   (h) identifying, by the search engine, any plurality of neighboring segment representations that (I) match previously stored segment representations in the database, and (II) have a total segment length significantly longer than the time length of an average commercial, wherein the total segment length is the total time length from the first to the last neighboring segment representations as determined from the respective timestamps; and (i) deleting as a segment representation of a potential commercial the plurality of neighboring segment representations identified in step (h).

9. The method of claim 1 wherein steps (e) and (f) are performed in parallel with one another.

10. The method of claim 1 wherein the commercial content includes (I) product or service advertisements, and (II) advertising for program type content.

11. The method of claim 1 wherein there are a plurality of different video data streams and wherein steps (a)-(f) are concurrently performed on each of the video data streams.

12. The method of claim 1 wherein the search engine uses audio-based automated content recognition (ACR).

13. The method of claim 1 wherein the search engine uses video-based automated content recognition (ACR).

14. An automated method of detecting potential repeating content in a video data stream, wherein segment representations of the video data stream are maintained in a first database, the method comprising:

(a) receiving one or more video data streams in a video processing engine;

(b) parsing, by the video processing engine, each video data stream directly into a plurality of successively contiguous segments;

(c) creating, by the video processing engine, a representation of each segment, the representation of each segment being one or more fingerprints;

(d) comparing, by a search engine that is in communication with the video processing engine, the plurality of segment representations to a plurality of known segment representations in a second database, and detecting any matches, the matches being likely known commercials, the method further comprising for segment representations that are not detected as matching known segment representations in the second database;

(e) storing the plurality of segment representations in the first database, the first database including database records, each record including one segment representation and an associated timestamp that represents the time that the segment was aired or streamed;

(f) identifying, by the search engine that is in communication with the video processing engine and the first database, any segment representations in the received and parsed one or more video data streams that match segment representations in the first database that were previously stored from video data streams that were previously received and parsed, wherein the video processing engine designates the content of each of the identified segment representations as being a portion of repeating content; and (g) electronically communicating the content of each of the segment representations identified in step (f) and the content of a predefined number of segment representations adjacent in time to the segment representations identified in step (f) to a content processing platform for subsequent recognition processing, wherein in step (g), the segment representations adjacent in time to the segment representations identified in step (f) and the corresponding content are not compared by the search engine to any other segment representations or content.

15. The method of claim 14 wherein the segment representations are temporarily stored in the database for a predefined period of time.

16. The method of claim 15 wherein the segment representations are stored for about 7 to about 14 days.

17. The method of claim 14 wherein the subsequent recognition processing includes review and classification of the content.

18. The method of claim 14 wherein each of the segments is about 2 seconds to about 10 seconds.

19. The method of claim 14 wherein each of the segments is about four seconds.

20. The method of claim 14 wherein steps (e) and (f) are performed in parallel with one another.

21. The method of claim 14 wherein there are a plurality of different video data streams and wherein steps (a)-(f) are concurrently performed on each of the video data streams.

22. The method of claim 14 wherein the search engine uses audio-based automated content recognition (ACR).

23. The method of claim 14 wherein the search engine uses video-based automated content recognition (ACR).

* * * * *